United States Patent
Morrison et al.

(10) Patent No.: US 6,329,920 B1
(45) Date of Patent: Dec. 11, 2001

(54) APPARATUS AND METHOD FOR READING RADIO FREQUENCY IDENTIFICATION TRANSPONDERS USED FOR LIVESTOCK IDENTIFICATION AND DATA COLLECTION

(75) Inventors: Matthew J. Morrison, Johnstown; Leland D. Curkendall, Longmont, both of CO (US)

(73) Assignee: Aginfolink Holdings Inc., Tortola (VG)

(*) Notice: Subject to any disclaimer, the term of this patent is extended or adjusted under 35 U.S.C. 154(b) by 0 days.

(21) Appl. No.: 09/488,897

(22) Filed: Jan. 21, 2000

Related U.S. Application Data

(63) Continuation-in-part of application No. 09/036,564, filed on Mar. 9, 1998.

(51) Int. Cl.[7] ................................ G08B 23/00
(52) U.S. Cl. ................... 340/573.3; 235/472.02; 340/5.8; 340/539; 340/691.1; 340/693.5
(58) Field of Search ............... 340/573.3, 573.1, 340/825.34, 10.1, 505, 691.1, 815.65, 5.8, 693.5, 539; 128/903; 119/51.02; 235/472.01, 472.02, 472.03

(56) References Cited

U.S. PATENT DOCUMENTS

| | | | |
|---|---|---|---|
| 3,844,273 | * 10/1974 | Polson | 119/51.02 |
| 4,247,758 | * 1/1981 | Rodrian | 377/6 |
| 4,262,632 | * 4/1981 | Hanton et al. | 119/51.02 |
| 4,463,353 | * 7/1984 | Kuzara | 340/10.34 |
| 4,475,481 | * 10/1984 | Carroll | 119/51.02 |
| 4,493,290 | * 1/1985 | Gibbard | 119/51.02 |
| 4,854,328 | * 8/1989 | Pollack | 128/903 X |
| 5,025,492 | * 6/1991 | Viereck | 340/572.1 |
| 5,235,326 | * 8/1993 | Beigel et al. | 340/10.41 |
| 5,252,962 | * 10/1993 | Urbas et al. | 340/870.17 |
| 5,280,159 | * 1/1994 | Schultz et al. | 235/472.01 |
| 5,315,505 | * 5/1994 | Pratt et al. | 128/903 X |
| 5,322,034 | * 6/1994 | Willham et al. | 119/174 |
| 5,526,772 | * 6/1996 | Curkendall | 119/174 |
| 5,617,075 | * 4/1997 | Worth et al. | 340/574 |
| 5,673,647 | * 10/1997 | Pratt | 119/51.02 |
| 5,725,578 | * 3/1998 | Knapp et al. | 623/11 |
| 5,857,434 | * 1/1999 | Andersson | 119/859 |
| 5,996,529 | * 12/1999 | Sissom et al. | 119/14.14 |
| 6,012,415 | * 1/2000 | Linseth | 119/174 |

FOREIGN PATENT DOCUMENTS

| | | | |
|---|---|---|---|
| 05448 | * 5/1990 | (WO) | 119/51.02 |
| 06105 | * 3/1994 | (WO) | . |

\* cited by examiner

Primary Examiner—Thomas Mullen
(74) Attorney, Agent, or Firm—Rick B. Yeager

(57) ABSTRACT

A portable, durable, easy-to-use, safety-oriented, long-life apparatus for reading radio frequency identification transponders is described. This apparatus is well-suited for use in connection with livestock data collection and management. The preferred embodiment includes a single wound radio frequency identification antenna coil; a radio frequency transmitter; a power control, system timing and driver including a low battery indicator, and an optical switch; a rechargeable battery; a main power switch; an infrared activation switch; a radio frequency link antenna, a receiver analog section, a micro controller, an exciter drive and a read switch; and audio feedback to confirm receipt of data.

40 Claims, 6 Drawing Sheets

APPARATUS AND METHOD FOR READING RADIO FREQUENCY IDENTIFICATION TRANSPONDERS USED FOR LIVESTOCK IDENTIFICATION AND DATA COLLECTION

CROSS-REFERENCE TO RELATED APPLICATION

This application is a continuation-in-part of application Ser. No. 09/036,564, entitled "Method and Apparatus for Livestock Data Collection and Management", filed Mar. 9, 1998. That application is pending before the Patent and Trademark Office at the time of the filing of this application. Application Ser. No. 09/544,388 is a related Divisional application of application Ser. No. 09/036,564.

BACKGROUND

1. Field of Invention

This invention relates to an apparatus for reading radio frequency identification transponders which are used to identify, track and monitor meat animals.

2. Description of Related Art Including Information Disclosed Under 37 CFR 1.97 and 37 CFR 1.98

Radio frequency identification is a flexible, integrated method for tracking, identifying and monitoring animals. Radio frequency identification transponders may be placed on an animal's ear or other portions of the animal's body. Transponders are generally passive devices which operate without a separate power source. When used to identify an animal, these devices contain a unique code for a particular animal. These passive electronic identification devices may be carried with the individual animal on a collar as illustrated and described in Carroll U.S. Pat. No. 4,475,481, issued Oct. 9, 1984, entitled "Identification System" and in Kuzara U.S. Pat. No. 4,463,353, issued Jul. 31, 1984, entitled "Animal Feeding and Monitoring System"; in an ear tag such as those commercially available from Destron/Fearing, Inc., Allflex USA, Inc. and Avid Marketing, Inc.; in an implant as in the animal illustrated and described in Pollack U.S. Pat. No. 4,854,328, issued Aug. 8, 1989, entitled "Animal Monitoring Telltale and Information System" and in Hanton U.S. Pat. No. 4,262,632, issued Apr. 21, 1981, entitled "Electronic Livestock Identification System"; or in a bolus such as illustrated and described in U.S. Pat. No. 4,262,632, issued Apr. 21, 1981, entitled "Electronic Livestock Identification System" by John P. Hanton and Harley A. Leach.

When transponders are read using a radio frequency identification reader, they provide the unique code for that animal's identification. Several RFID readers are commercially available, typically from the transponder suppliers, including models from Destron/Fearing, Inc., Allflex USA, Inc. and Avid Marketing, Inc.

The prior art includes RFID readers that can distinguish multiple types of RFID transponders as illustrated and described in U.S. Pat. No. 5,235,326, issued Aug. 10, 1993, entitled "Multi-mode Identification System" to Michael L. Beigel, Nathaniel Polish, and Robert E. Malm. Another such reader is that illustrated and described in U.S. Pat. No. 5,952,935, issued Sep. 14, 1999, entitled "Programmable Channel Search Reader" to E. Zeke Mejia and Ian Griffiths.

Transponders may also be used in a novel way to identify livestock "events" and "details" associated with a particular animal as described in "Method and Apparatus for Livestock Data Collection and Management" filed by one of the Applicants herein. Such "events" and "details" may include medications, vaccinations, and treatments. These event/detail transponders may be read in connection with the transponder having the unique code for the animal to indicate, among other things, that an animal has received a particular medication, vaccination or treatment. The "events" and "details" may include other identifying information on the animal, such as the animal's color, breed, sex and birth date.

This information is significant in that it may be used in various ways to assist those involved in the production/processing cycle for purposes of quality assurance verification and performance tracking. Those involved in the production and processing cycle of the beef industry, for example, are interested in the following: identifying which animals have a good calving history; monitoring the performance of various pastures; recording calf birth date and birth weight statistics and tracking the genetic history of each animal; evaluating the performance of calves from particular cows or bulls; recording the weaning date and weaning weight of each animal; recording treatments, vaccinations, and other significant or events that have occurred in the animal's life in order to track of the success of treatments as well as to eliminate duplicate treatments; recording beginning, ending, and periodic weight measurements and treatments; recording frame size, muscling, fat content, marbling, and feed efficiency; monitoring health and drug treatments, nutrition, and growth history; recording live animal weight, carcass weight, chilled carcass weight; and recording the yield, grade, and quality of the carcass and carcass defects.

SUMMARY OF THE INVENTION

Radio frequency identification transponders and radio frequency identification readers have been effective tools in identifying, tracking and monitoring livestock. The reader of the present invention supports an effective data collection and management methodology in the livestock industry. The reader is durable, safety-oriented, easy-to-use and has a long life span. In the preferred embodiment for the reader, the reader is portable and has audio feedback to confirm the receipt of data. Animals are often restrained in chutes for purposes of reading the animal's unique code transponder and giving medications, vaccinations or treatments to a particular animal. This invention features a reader that is designed to be hand held in a working chute environment, such that it is rugged and moisture resistant. The reader has an enclosed housing such that its circuitry and components are protected, which further makes it suitable for a working chute environment. The preferred flashlight shape permits a familiar and convenient object to be held by the user.

When readers are used for animal identification, a transponder is attached or integrated into the animal's body. These animals may easily weigh well over 1,000 pounds. The reader of the present invention has a handle designed for safety such that when the user work with large animals such as livestock, the user is able to stay a safe distance away from the animal.

Prior art readers which generally use mechanical switches suffer wear from use. The reader of the present invention has an infrared activation switch designed for ease of use, thus avoiding the problems associated with a mechanical switch. The reader of the present invention also has a feedback means whereby an audible signal confirms that data read by the reader from the transponder was received. This feature furthers the reader's ease of use. With the addition of audio feedback, and especially with wireless headphones or speakers at fixed reader locations, the user becomes completely mobile while performing tasks. The user now roams freely, scanning cows and entering the results of pregnancy checks, scanning steers as the steer are sorted to various locations, or other tasks. An optical signal in the form of a light may also be used to confirm receipt of data. Moreover, the reader has a greater amount of versatility since it can read multiple types of transponders.

The rigid body permits the reader to be placed into an alleyway, cage, or chute. The reader may also communicate over greater distances to a host computer or data consolidation device. Some currently available readers offer relatively stick-type RFID antennas that can be placed into a pen or chute, and a cable connecting the antenna to a separate enclosure with a hand-held or lap-top computer. In these designs, the cable interface to the antenna is typically a weak point which will break down from repeated mechanical strain. The RF link of the reader of the present invention eliminates cables and, therefore, the physical weak point. It also allows the unit to be a compact, easy-to-handle device without unwieldy cables that tangle and interfere with the user's job. The RF link communications provide the user improved range and flexibility in the work area.

The reader is designed such that rechargeable batteries with long life spans may be used. These rechargeable batteries may have a life span of more than five hundred (500) charge/recharge cycles. Therefore, maintenance for the reader is less expensive and more convenient to use since the same battery may be used for a relatively long period of time. The center of gravity of the reader is near the handle section. The reader is thus counter-balanced for ease of handling.

Another object of the present invention is to provide a reader which supports an effective data collection and database management methodology in the livestock industry including automated entry of individual animal identification, and automated entry of events and data in the processing cycle.

Although the invention is described in the context of beef cattle, it is not so limited. It should be apparent to those skilled in the art that the invention can be modified for use in other industries without departing from the spirit and scope of the invention.

DESCRIPTION OF FIGURES

These and other features, aspects, and advantages of the present invention will become better understood with regard to the following description, appended claims, and accompanying drawings where:

DETAILED DESCRIPTION OF THE INVENTION

Figure 1:
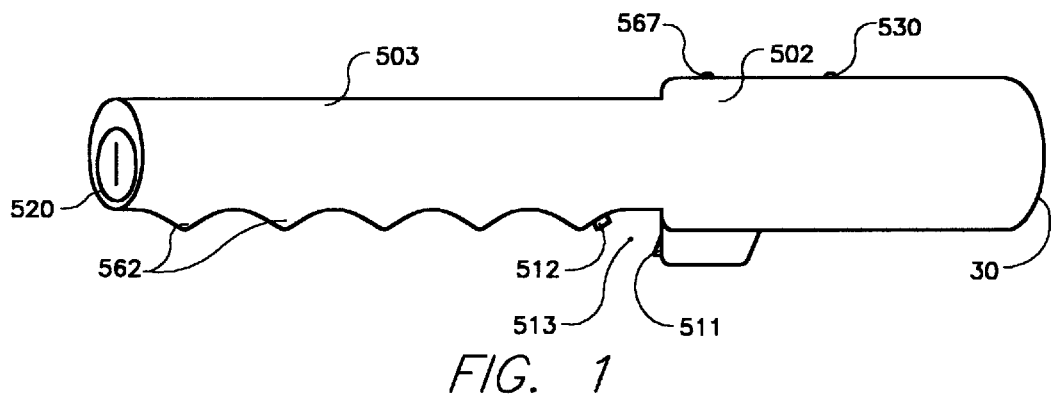
FIG. 1 is a side view of an RFID/RF link handheld reader.

In accordance with the preferred embodiment of the present invention, an apparatus for reading radio frequency identification transponders is described. The objectives of the present invention are to provide an easy-to-use, convenient, durable, safety-oriented, long-life, portable apparatus for reading radio frequency identification transponders, such that livestock data collection and data management will provide quality assurance, HACCP compliance, and source verification data for individual animals throughout the production cycle. The resulting information will provide a basis for the producer, the stockman, the feedlot, and the packer to make informed herd management and operational decisions. Components of the reader include a radio frequency loop antenna; a radio frequency transmitter; a power control, system timing and driver including a low battery indicator and a visual feedback light; a rechargeable battery; a main power switch; an infrared activation switch; a radio frequency link antenna, a receiver analog section, a micro controller, an exciter drive and read switch; and audio feedback connected to a host computer to confirm receipt of data.

Radio Frequency Identification Transponders

An animal is uniquely identified by means of a radio frequency identification (RFID) ear tag, or other type of transponder. The preferred identification is an RFID ear tag such as those provided by Destron/Fearing, Inc., Allflex USA, Inc, Avid Marketing, Inc. Alternately, the identification may be by means of an RFID implant, a rumen bolus, or a collar fitting on the neck or leg. The RFID transponder contains a small coil attached to an integrated circuit that stores a unique code. Unlike bar codes, RFID transponders do not require line-of-sight to be read, the transponder simply needs to come into the proximity of an RFID reader. As the animal is typically restrained in a working chute, its identification may be determined by means of the RFID reader. This identification is accomplished by placing the reader near, typically within fifteen centimeters (six inches), of an RFID ear tag or implant transponder. The rumen bolus has a greater range. The range performance of the reader in relation to the transponder is orientation sensitive.

RFID identification is typically applied to young animals at the first opportunity to pen and work the animals, such as at an initial immunization. The RFID identification, typically will have previously been applied to older breeding animals, and will typically remain with the animal until slaughter.

Transponders may also be used to record certain "events" or "details" associated with a particular animal. Rather than typing in events at a keyboard, events or details are assigned to transponders ahead of time so that transponders are simply scanned with the reader, just as the transponders are used to store the animal's identification. Such "events" or "details" may include medications, vaccinations, and treatments. These event/detail transponders may be read in connection with the transponder having the unique code for the animal to indicate, among other things, that an animal has received a particular medication, vaccination or treatment. These event/detail transponders may also be read in connection with the unique animal code transponder to indicate, among other things, that an animal has certain qualities or characteristics, e.g., sex, breed, or color. The event/detail transponders may include other identifying information on the animal, such as the animal's birth date.

With the addition of audio feedback as in the preferred embodiment for the present invention, the user of the reader may get an audible message confirming receipt of data. For example, where wireless headphones are used, the user could scan a red steer and give the steer a brucellosis vaccination. As the user scanned the red steer, the user would get the audible confirmation: "Red steer". As the user scanned the transponder identifying the brucellosis vaccination, the user would get the audible confirmation: "brucellosis vaccination".

Radio Frequency Identification Reader

FIG. 1 is a side view of a reading device that is generally referred to as a flashlight reader because the unit is held as a large flashlight would be held. The preferred method of reading RFID transponders is with a portable reader such as this device.

The reader's long handle is designed to increase the distance between the user and livestock. Many times, livestock are restrained in what are commonly known as squeeze chutes. These chutes are used to restrain the livestock when some treatments, medications and/or vaccinations are administered. For example, a steer may be dehorned, given a medication for deworming, or a vaccination for Pasteurella. The reader of the present invention facilitates these processes with its lengthy handle. This handle protects the user of the reader as the user reads the animal's unique code transponder in connection with administering these treatments, medications and/or vaccinations to the animal. The reader has an approximate length of 45 centimeters (eighteen inches) so that it can be held by hand outside of a working chute, and the reader may then extend into the chute to reach approximately 12–15 centimeters (5–6 inches) from the animal's ear tag or implant. The reader is still short enough such that the distance is not too great between the user and the object the user attempts to read. Difficulties may arise when the user is too far away due to decreased ability to see the transponder. Difficulties may also arise with a longer reader because it may be difficult or awkward to manage with a longer handle. The handle section of the body of the reader was also designed for convenient holding. The slightly elliptical body 30 of the reader has a handle section 503 of a diameter of approximately 3.8–4.5 centimeters (1.5 to 1.8 inches) for the convenient holding of the reader by hand. A relatively larger section 502 is provided in order to house electronic components for the RFID function. The reader has finger grips 562 for ease of handling The reader consists of a generally slightly elliptical body 30, constructed of a rugged material such as ZYTEL™ nylon, which is very tough nylon, or a rugged material such as polyurethane. The housing material may be reinforced with other materials such as glass. For example, the housing may be made of a thirty percent (30%) glass reinforced polyurethane. The rugged material is used so that the reader can endure the mechanical and chemical stresses which are found in field use. For example, strong chemicals are used in slaughterhouses for purposes such as sterilizing meat hooks.

The reader has an enclosed housing. The housing for the reader is splash-resistant and is caulked with silicone caulking or RTV. Since the reader may be dropped in the field in substances such as mud, dirt or livestock excrement, or placed in the rain or other elements, the enclosed housing helps protect the circuitry and components of the reader, thereby increasing the reader's life span.

A battery compartment is accessed through a battery door 520 that is sealed by a gasket. The battery is heavy relative to the other components, so the center of gravity of the unit is near the handle section. The reader is thus counter-balanced for ease of handling. A low battery indicator 567 is visible to the user.

Although a mechanical or other type of switch may be employed, the preferred method of operating the device is an infrared activation switch, which consists of an infrared emitter, or infrared light source 511 and an infrared detector 512 which will form a light circuit that can be broken by placing a thumb, index finger, or a mechanical object in the space 513 between the light source and the reader. The mechanical object is desirable in some circumstances to leave the reader in an activated state while it is extended further into a working chute.

Figure 2:
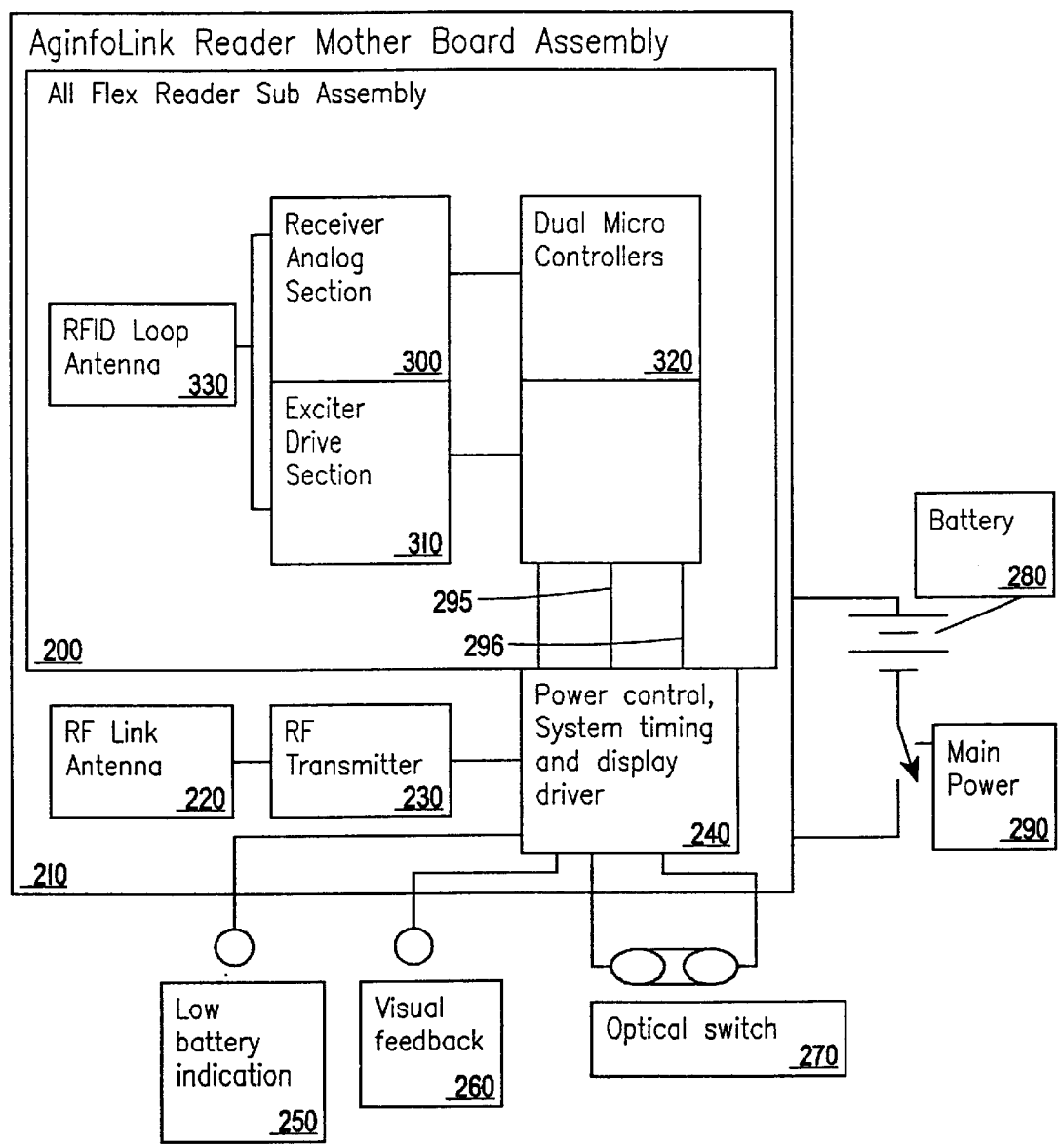
FIG. 2 is an internal schematic of the circuitry for an RFID/RF link handheld reader.

The preferred method of communicating with the reader is through radio frequency link with the circuitry as shown in FIG. 2. Referring now to FIG. 2, a block diagram of the circuitry for the hand held reader, the reader includes a subassembly 200 manufactured by ALLFLEX, and RF link circuitry 210. The RF link circuitry 210 includes a radio frequency link antenna 220, a radio frequency transmitter 230, a power control, system timing and display driver 240. A receiver located at the communicating device, e.g., a host computer, assists in transferring the data from the reader to the communicating device. The power control, system timing and display driver also include a low battery indicator 250, a visual feedback 260, and an infrared activation switch 270. In an alternative embodiment to the RF link communications, the reader can be tethered with a cable and an RS232 interface directly to a computer or external device.

A holster is typically provided to hold the reader when it is not in use.

Referring again to FIG. 2, a block diagram of the circuitry of the reader, the reader includes a rechargeable battery 280 and a main power switch 290, RFID electronic circuitry which includes an analog receiver section 300, an exciter drive section 310 and dual micro controllers 320. The reader also has an RFID loop antenna 330 and a read switch 295 which can make a local read of the tag data 296.

Figure 3A:
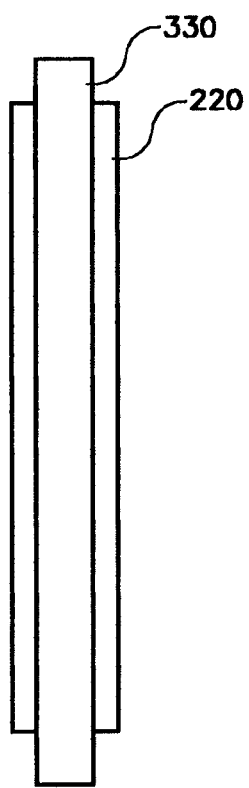
FIG. 3A is a conceptualized side longitudinal view of the antennas configuration for an RFID/RF link handheld reader.

Referring now to FIG. 3A, a conceptualized longitudinal view of the preferred embodiment for the configuration of the antennas circuitry, the RFID link antenna 342 is generally centered within the inside perimeter of the loop antenna 330. The RFID link antenna 342 can change elevation with respect to the loop antenna 350 while staying parallel to the loop without affecting performance. This placement of antennas makes the reader more compact. Generally, these antennas, if placed in close proximity to one another, would cause interference between each other and would not operate properly.

Figure 3B:
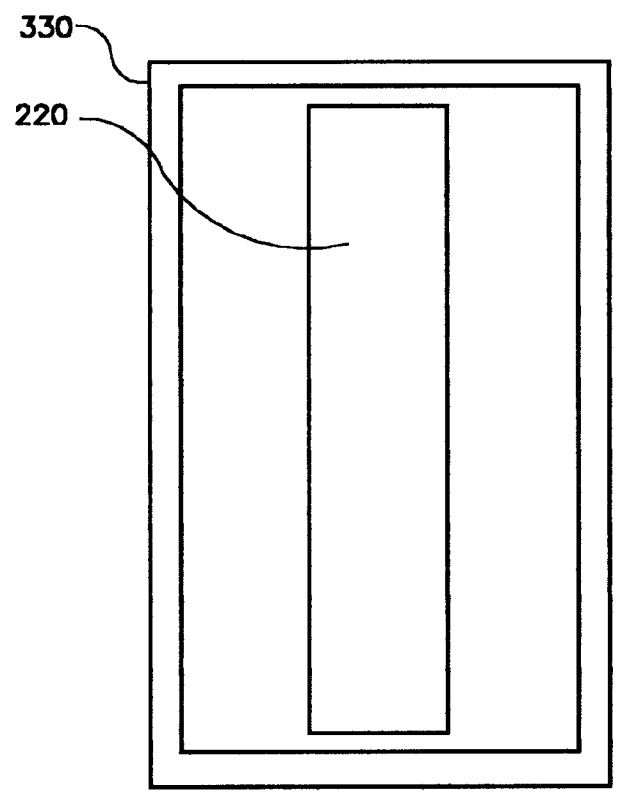
FIG. 3B is a conceptualized front view of the antennas configuration for an RFID/RF link handheld reader.

Referring now the FIG. 3B, preferably, the RFID link antenna 342 should not come within about ½" of the sides of the loop antenna 350. The minimum distance would change depending upon the frequency of the radio frequency system. In the reader of the present invention, the antennas are strategically placed so that interference between the antennas is minimized. By positioning the antennas in the configuration shown in FIGS. 3A and 3B, the usage of space within the housing of the reader is maximized without affecting the radiation pattern or significant tuning of either antenna. For example, if the antennas were to be housed below the circuit board, the radiation pattern and tuning would require adjustment. RF link electronic circuitry is included as described in more detail above, as well as visual feedback as described above.

Figure 4:
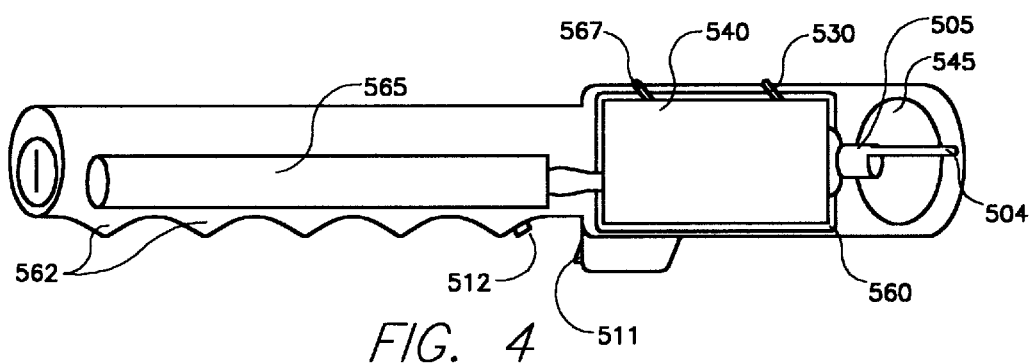
FIG. 4 is a cross sectional view of an RFID/RF link handheld reader.

Referring to FIG. 4 which is a cross sectional view of the reading device described above, the reader includes a rechargeable battery 565, RFID electronic circuitry 540, an RFID loop antenna 545, RF link electronic circuitry 560, a status light 530 and finger grips 562. The RF link antenna 504 s connected to the reader by means of an antenna connector 505 that is disposed within the reader body 30. The RF link antenna 504 is not field replaceable. The rechargeable battery 565 is preferably a commercially available battery pack such as that used in portable power tools. The RFID electronic circuitry is available from preferably All-Flex USA, Inc. The low battery indicator 567 informs the user whether or not the battery power is low.

The RFID loop antenna is preferably a single wound coil. The antenna, when it is brought within a range that is typically 12–15 centimeters (5 to 6 inches) from the transponder in the case of RFID ear tags or implants, is able to detect the RFID signal from those devices. The RFID circuitry interprets the signal and communicates the results to the RF link circuitry, which communicates that result by means of radio frequency broadcast with a typical range of up to 150 meters (500 feet). The visual feedback is preferably a 3-stage LED display that will show one color to indicate that the power is in the ON state, a second color to indicate that an RFID signal has been detected, and a third color to indicate that the RFID signal has been confirmed by the host computer. For example, red could indicate that the unit is on; flashing yellow can be used to show that an RFID signal has been detected; green could be used to indicate that an RFID signal was confirmed by the host computer. Standard bi-color LED's can be used to indicate the three stages. An LED having red and green as its colors can be made to create the yellow color.

Figure 5:
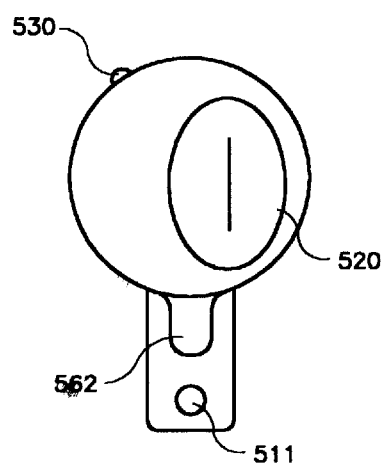
FIG. 5 is an end view of an RFID/RF link handheld reader.

Referring to FIG. 5 which is the handle end view of the reader, the RF link antenna extends away from the user, and the visual feedback, or status light 530 is located such that the user can observe the light while operating the reader. The infrared activation switch is defined by the infrared components 511 and 512 that are typically located at the bottom of the unit.

Operation of the Reader's Components

Figure 6:
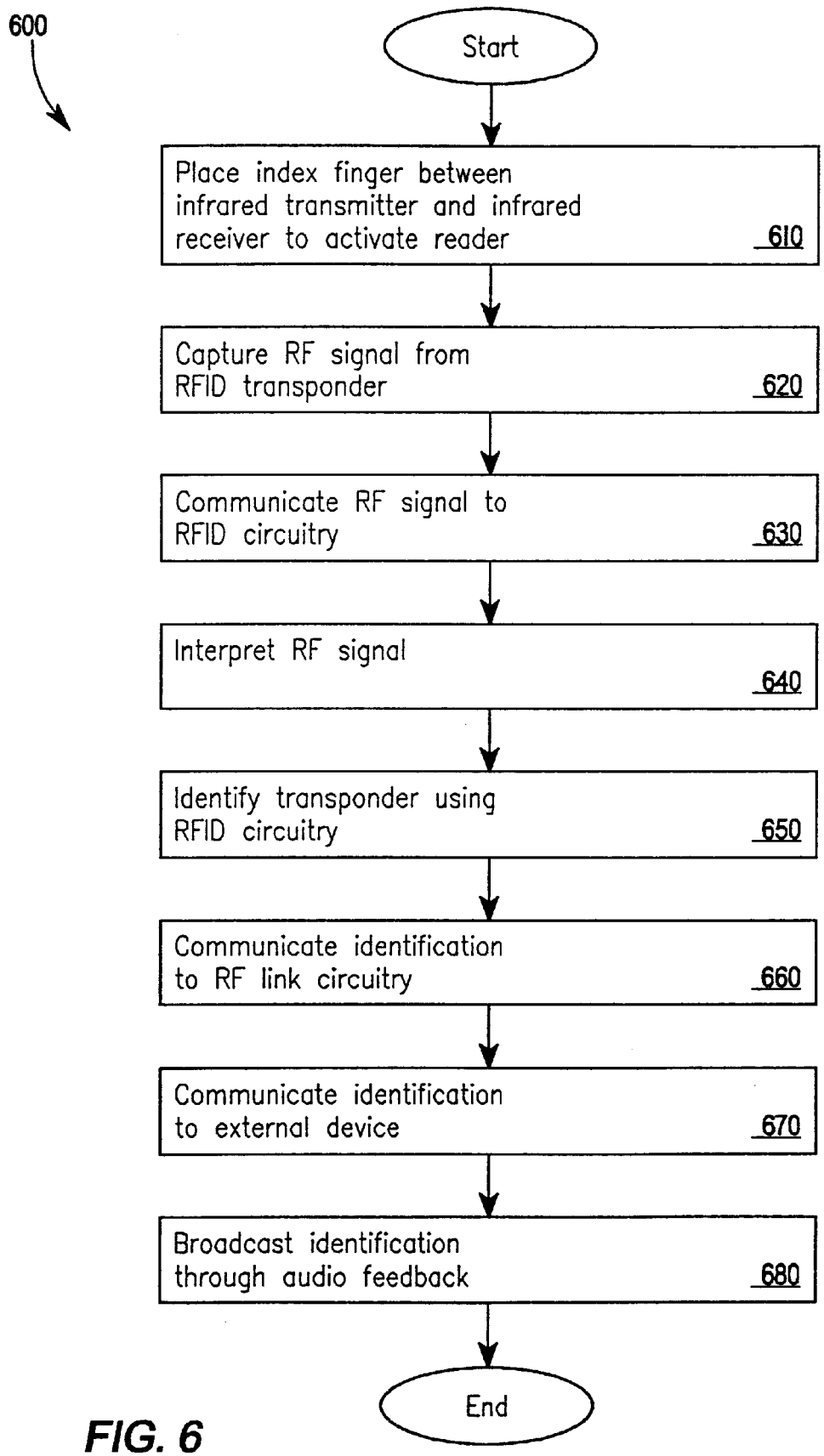
FIG. 6 is a flow chart illustration of the operation of the reader.

Referring now to FIG. 6, a flow chart illustration of the reader's operation 600, the reader is turned on using the main power switch. The reader may then be activated using the infrared activation switch as in step 610. In the preferred embodiment of the electronic circuitry for the reader, when the reader is activated using the infrared activation switch, the RFID electronic circuitry, the RF link circuitry, the RFID antenna and the RF link antenna spring into action. A radio frequency identification loop antenna captures a radio frequency signal from the radio frequency identification transponder at step 620 and communicates that signal to the analog receiver at step 630. The analog receiver captures the radio frequency signal and encodes that signal into a digital signal 640. The micro controller or dual micro controllers decode the digital signal from the transponder and converts the digital signal into a unique code from the transponder 650. The transponder identification data is read. At this point, the radio frequency signal goes through the radio frequency link circuitry as in step 660. The radio frequency link antenna broadcasts a radio frequency transponder identification through the radio frequency link antenna to the interface of a host computer as in step 670. A radio frequency transmitter passes the radio frequency signal from the reader to a radio frequency receiver located at the host computer. The host computer may then broadcast the identification through an audio feedback means as in step 680.

Communicating Data from Reader

The RFID reader typically communicates either wirelessly to a radio receiver/transmitter which is connected directly to a computer port or through a cable to a serial port on a computer.

Figure 7:
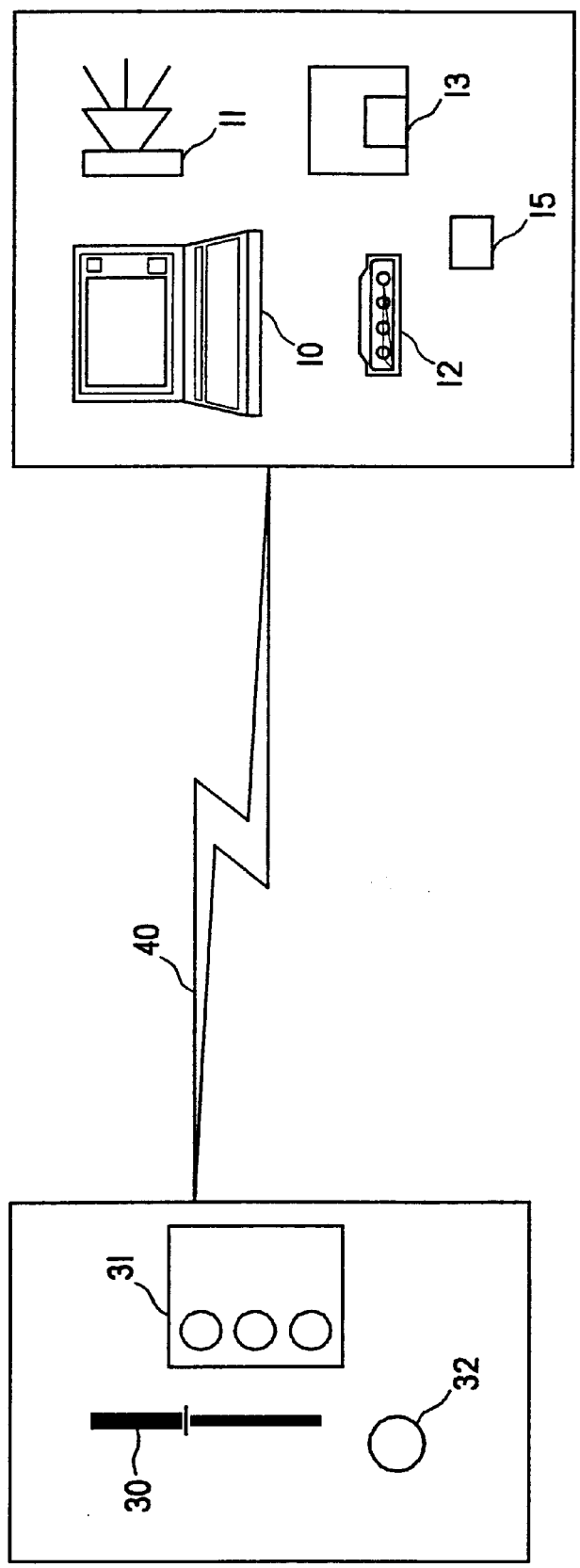
FIG. 7 is a schematic showing a wireless radio frequency link (RF link) connection between the RFID reader and a host computer.

Referring now to FIG. 7, a radio frequency wireless connection 40 is used for communication between the RFID reader 30, the host computer 10 and a receiver 15. In this case, animal identification would be obtained from an RFID transponder 32, and Work Cards 31 with RFID event transponders are used to record events.

The speaker 11 provides a feedback means to confirm the receipt of animal and event data by the computer and BEEFLINK data collection software running on the host computer. When the host computer 10 confirms that the transponder identification was handled within the BEEFLINK data collection software, the reading of a .WAV file is initiated in the host computer and the .WAV file is played through the PC sound card to the speaker 11.

The modem 12 in this embodiment permits the host computer to establish data transfer capability with other computers, and the removable disk 13 provides a data backup capability.

Figure 8:
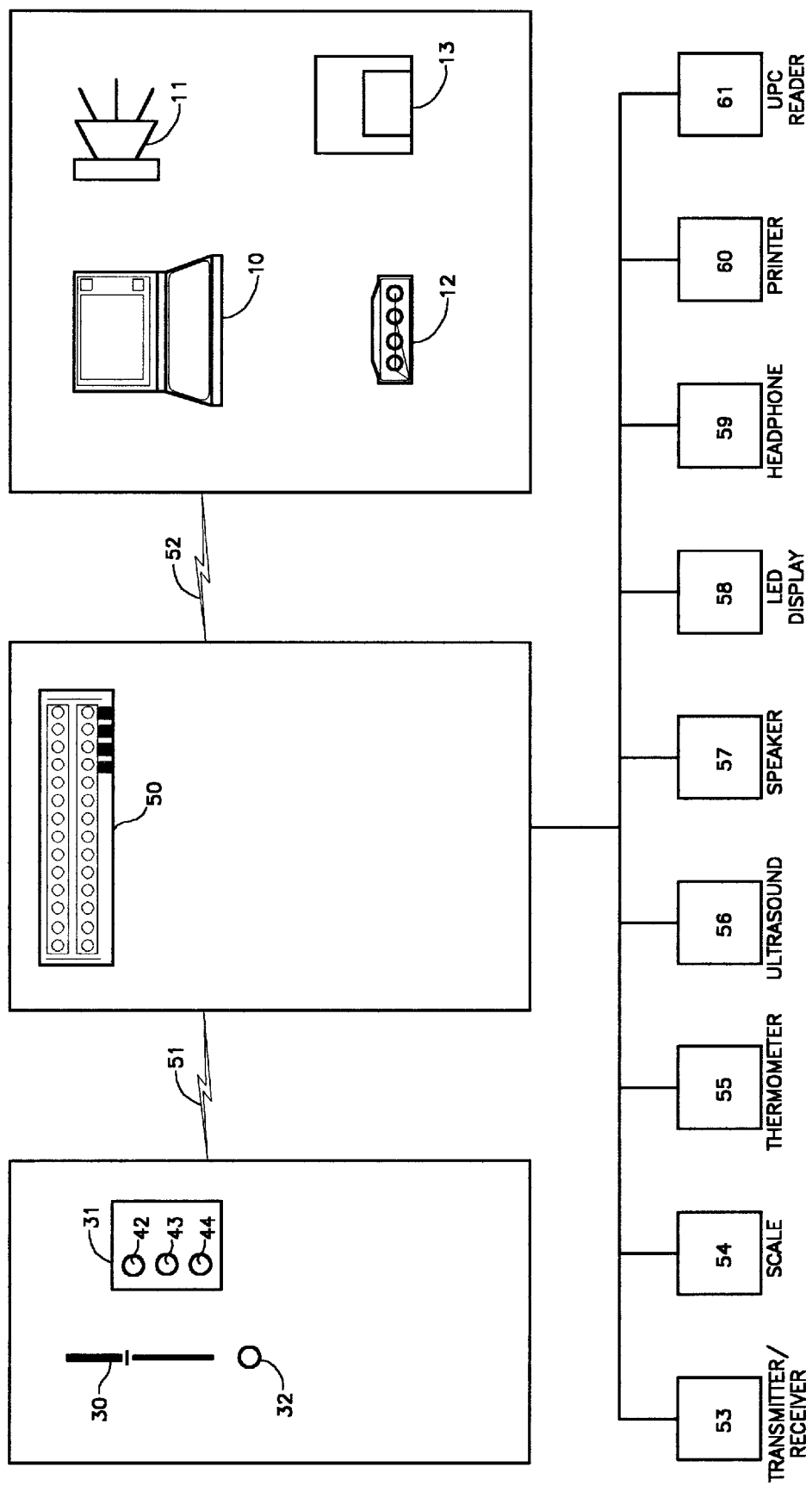
FIG. 8 is a schematic showing a wireless radio frequency link (RF link) connection to a multiple input/output data concentrator device located between the RFID reader and a host computer.

Referring now to FIG. 8, a schematic showing an alternate embodiment for communicating from the reader, a hardware device called a Data Concentrator 50 may be used as a hub to receive inputs from multiple peripherals and to send the data to the host computer 10. First, an animal is uniquely identified by means of a radio frequency identification (RFID) ear tag 32 or other type of transponder. As the animal is typically restrained in a working chute, its identification may be determined by means of an RFID reader 30. This identification is accomplished by placing the reader near, typically within fifteen centimeters (six inches), of an RFID ear tag or implant transponder. The rumen bolus has a greater range.

Typical events performed on the animal may also be captured without keyboard entry by means of a Work Card 31 which is a collection of common tasks or events that are assigned unique RFID transponder codes, indicated as transponders 42, 43 and 44, such that the reader can designate an event by reading the transponder associated with an event. This reading is accomplished by placing the reader near the transponder. Alternately, the event transponders can be placed separately at convenient locations in the work area. The event transponders will typically be labeled with text or symbols to identify the event.

A data concentrator unit 50, which is typically a commercially available, multiple serial port, input/output device is used to collect the reader signal. The reader communicates by means of radio frequency link to a radio frequency receiver/transmitter that is connected by serial port 53 to the data concentrator unit. The reader may be connected by direct cable linkage to the port, or preferably, will communicate by radio frequency link means 51 from a transmitter/receiver located on the reader to a transmitter/receiver connected to port 53.

The data concentrator may also collect other livestock measurement data through serial port connections such as a scale 54, a thermometer 55, or an ultrasound measurement device 56. The data concentrator may also be connected to various output devices such as a speaker 57, an LED display 58, a headphone 59, a printer 60, or a UPC Barcode printer or reader 61. The data concentrator communicates to a computer 10. The preferred communication is a radio frequency link 52 between a transmitter/receiver attached to the data concentrator and a transmitter/receiver attached to an interface board in the computer. The computer may include a keyboard, a monitor, and a speaker 11. Data may be stored to a diskette 13, but will typically be transferred by means of a modem. The computer is preferably an IBM compatible laptop or desktop computer. BEEFLINK data collection software runs on the computer to provide the livestock data entry management function. The computer is connected by means of modem 12 to other computers as described more fully in other example embodiments.

This embodiment permits a portable reader to be used in a remote location to gather animal and event data and to communicate that data to a host computer.

What is claimed is:

1. A portable, hand-held radio frequency identification reader comprising:

housing means;

handle means integral to said housing means;

exciter drive means for inducing current in a radio frequency identification loop antenna means such that a magnetic field is created which powers a radio frequency identification transponder, said exciter drive means being disposed within said housing means;

radio frequency identification loop antenna means for capturing a radio frequency signal from the radio frequency identification transponder and communicating said signal to an analog receiver means, said radio frequency identification loop antenna means being disposed within said housing means;

analog receiver means for capturing the radio frequency signal from said radio frequency loop antenna means and encoding said signal into a digital signal, said analog receiver means being disposed within said housing means;

micro controller means for decoding said digital signal from the analog receiver means and converting said digital signal into a unique code, said microcontroller means being disposed within said housing means;

read switch means for reading the identification from the transponder, said read switch means being disposed within said housing means; radio frequency transmitter means for transmitting the radio frequency signal to a host computer, said radio frequency transmitter means being disposed within said housing means;

radio frequency link antenna means for broadcasting said unique code to a host computer, said radio frequency link antenna means being disposed within said housing means;

power supply means for providing power to the reader, said power supply means being disposed within said housing means; and power control, system timing and display driver means including an activation switch means for activating said reader, said activation switch means thereby causing said reader to read a radio frequency identification transponder, said activation switch means being integral to said housing means.

2. The apparatus of claim 1 wherein
said activation switch means includes an infrared transmitter and receiver.

3. The apparatus of claim 2 wherein
said activation switch means is activated by placing an object between the infrared transmitter and receiver to break a circuit of infrared light and cause the switch to be in an ON position and the object is removed from between the receiver and transmitter to close a circuit of infrared light and cause the switch to be in an OFF position.

4. The apparatus of claim 3 wherein
said activation switch means is located such that the index finger of a hand holding the reader may be easily placed between the transmitter and receiver to break a circuit of infrared light and cause the switch to be in an ON position, and the index finger can be easily removed from between the transmitter and receiver to close a circuit of infrared light and cause the switch to be in an OFF position.

5. The apparatus of claim 4 wherein
said radio frequency link antenna means is located within the inside perimeter of the radio frequency identification loop antenna means.

6. The apparatus of claim 5, further comprising:
audio feedback means for broadcasting a confirmation that the radio frequency signal from the radio frequency identification transponder was received by the host computer.

7. The apparatus of claim 5 wherein
said power control, system timing and display driver means includes a low power indicator means for indicating low power, and visual feedback means for verifying receipt of data, said low power indicator means and said visual feedback means being integral to said housing.

8. The apparatus of claim 7 wherein
the visual feedback means is a status light integral to said housing means, such that the light is connected to said analog receiver means, said exciter drive means, said micro controller means, and said read switch means, and said status light will display a first color to indicate that power is available and the light will display a second color to indicate that a radio frequency identification signal has been received and interpreted.

9. The apparatus of claim 7 wherein
the visual feedback means is a status light integral to said housing means, such that the light is connected to said analog receiver means, said exciter drive means, said micro controller means, and said read switch means, and said status light will display a first color to indicate that power is available, a second color to indicate that a radio frequency identification signal has been received, and a third color to indicate that an external device has confirmed receipt of the data.

10. The apparatus of claim 9 wherein
said power supply means is a rechargeable battery having at least five hundred charge/discharge cycles.

11. The apparatus of claim 10 wherein
said housing means is constructed of ZYTEL™ nylon.

12. The apparatus of claim 10 wherein
said housing means is constructed of glass-reinforced polyurethane.

13. The apparatus of claim 3 wherein
said activation switch means is located such that the thumb of a hand holding the reader may be easily placed between the transmitter and receiver to break a circuit of infrared light and cause the switch to be in an ON position, and the thumb can be easily removed from between the transmitter and receiver to close a circuit of infrared light and cause the switch to be in an OFF position.

14. A portable, hand-held radio frequency identification reader comprising:

housing having a handle integral to said housing;
a radio frequency identification antenna disposed within said housing;
radio frequency identification circuitry disposed within said housing;
radio frequency link circuitry disposed within said housing;
a radio frequency link antenna disposed within said housing;
a rechargeable battery disposed within said housing, said rechargeable battery having at least five hundred charge-discharge cycles;
a main power switch integral to said housing;
power control, system timing and display driver including an activation switch integral to said housing, such that the activation switch activates the radio frequency identification circuitry, said activation switch including an infrared transmitter and receiver;
wherein said rechargeable battery is connected to said radio frequency identification circuitry and to said radio frequency link circuitry, and said radio frequency identification antenna is connected to the radio frequency identification circuitry such that the antenna may capture a radio frequency signal from a radio frequency identification transponder and communicate said signal to the radio frequency identification circuitry, and the radio frequency identification circuitry may interpret the signal and identify the transponder and communicate the identification to the radio frequency link circuitry.

15. The apparatus of claim 14 wherein
said activation switch is activated by placino an object between the infrared transmitter and receiver to break a circuit of infrared light and cause the switch to be in an ON position and the object is removed from between the receiver and transmitter to close a circuit of infrared light and cause the switch to be in an OFF position.

16. The apparatus of claim 15 wherein
said activation switch is located such that the index finger of a hand holding the reader may be easily placed between the transmitter and receiver to break a circuit of infrared light and cause the switch to be in an ON position, and the index finger can be easily removed from between the transmitter and receiver to close a circuit of infrared light and cause the switch to be in an OFF position.

17. The apparatus of claim 16 wherein
said radio frequency link antenna is located within the perimeter of the radio frequency identification loop antenna.

18. The apparatus of claim 17, further comprising:
audio feedback means for broadcasting a confirmation that the radio frequency signal from the radio frequency identification transponder was received by the host computer.

19. The apparatus of claim 17 wherein
said power control, system timing and display driver include a visual feedback means integral to said housing.

20. The apparatus of claim 19 wherein
the visual feedback means is a status light integral to said housing, such that the light is connected to said radio frequency identification circuitry and said status light will display a first color to indicate that power is available and the light will display a second color to indicate that a radio frequency identification signal has been received and interpreted.

21. The apparatus of claim 19 wherein
the visual feedback means is a status light integral to said housing, such that the light is connected to said radio frequency identification circuitry, and said status light will display a first color to indicate that power is available, a second color to indicate that a radio frequency identification signal has been received, and a third color to indicate that an external device has confirmed receipt of the data.

22. The apparatus of claim 21 wherein
said housing is constructed of ZYTEL⊥ nylon.

23. The apparatus of claim 22 wherein
the radio frequency link circuitry may be removed as a module and replaced with a direct cable connection from the reader to an external device.

24. The apparatus of claim 21 wherein
said housing is constructed of glass-reinforced polyurethane.

25. The apparatus of claim 15 wherein
said activation switch is located such that the thumb of a hand holding the reader may be easily placed between the transmitter and receiver to break a circuit of infrared light and cause the switch to be in an ON position, and the thumb can be easily removed from between the transmitter and receiver to close a circuit of infrared light and cause the switch to be in an OFF position.

26. An apparatus for reading radio frequency identification transponders comprising:
housing having a handle integral to said housing;
a single wound radio frequency identification antenna coil disposed within said housing;
radio frequency identification circuitry disposed within said housing;
radio frequency link circuitry disposed within said housing;
a radio frequency link antenna disposed within said housing;
a rechargeable battery disposed within said housing, said rechargeable battery having at least five hundred charge-discharge cycles;
a main power switch integral to said housing;
power control, system timing and display driver including an activation switch integral to said housing, such that the activation switch activates the radio frequency identification circuitry, said activation switch including an infrared transmitter and receiver;
wherein said rechargeable battery is connected to said radio frequency identification circuitry and to said radio frequency link circuitry, and said single wound radio frequency identification antenna coil is connected to the radio frequency identification circuitry such that the single wound radio frequency identification antenna coil may capture a radio frequency signal from a radio frequency identification transponder and communicate said signal to the radio frequency identification circuitry, and the radio frequency identification circuitry may interpret the signal and identify the transponder and communicate the identification to the radio frequency link circuitry.

27. The apparatus of claim 26 wherein
said activation switch is activated by placing an object between the infrared transmitter and receiver to break a circuit of infrared light and cause the switch to be in an ON position and the object is removed from between the receiver and transmitter to close a circuit of infrared light and cause the switch to be in an OFF position.

28. The apparatus of claim 27 wherein said activation switch is located such that the index finger of a hand holding the reader may be easily placed between the transmitter and receiver to break a circuit of infrared light and cause the switch to be in an ON position, and the index finger can be easily removed from between the transmitter and receiver to close a circuit of infrared light and cause the switch to be in an OFF position.

29. The apparatus of claim 28 wherein said RF link antenna is located within the perimeter of the single wound radio frequency identification antenna coil.

30. The apparatus of claim 29, further comprising:

audio feedback means for broadcasting a confirmation that the radio frequency signal from the radio frequency identification transponder was received by the host computer.

31. The apparatus of claim 29 wherein:

said power control, system timing and display driver include a visual feedback means integral to said housing.

32. The apparatus of claim 31 wherein the visual feedback means is a status light integral to said housing, such that the light is connected to said radio frequency identification circuitry and said status light will display a first color to indicate that power is available and the light will display a second color to indicate that a radio frequency identification signal has been received and interpreted.

33. The apparatus of claim 31 wherein the visual feedback means is a status light integral to said housing, such that the light is connected to said radio frequency identification circuitry, and said status light will display a first color to indicate that power is available, a second color to indicate that a radio frequency identification signal has been received, and a third color to indicate that an external device has confirmed receipt of the data.

34. The apparatus of claim 33 wherein said housing is constructed of ZYTEL™ nylon.

35. The apparatus of claim 33 wherein said housing is constructed of glass-reinforced polyurethane.

36. The apparatus of claim 29 wherein the radio frequency link circuitry may be removed as a module and replaced with a direct cable connection from the reader to an external device.

37. The apparatus of claim 27 wherein said activation switch is located such that the thumb of a hand holding the reader may be easily placed between the transmitter and receiver to break a circuit of infrared light and cause the switch to be in an ON position, and the thumb can be easily removed from between the transmitter and receiver to close a circuit of infrared light and cause the switch to be in an OFF position.

38. A method for reading radio frequency identification transponders comprising the steps of:

activating radio frequency identification circuitry, using an activation switch; capturing a radio frequency signal, using a single wound radio frequency identification antenna, from a radio frequency identification transponder;

communicating said signal to radio frequency identification circuitry;

interpreting said signal using radio frequency identification circuitry;

identifying said transponder using radio frequency identification circuitry;

communicating the transponder identification to an external device by means of radio frequency link circuitry; and providing an audio confirmation of the receipt of the transponder identification by the external device.

39. The method of claim 38, further comprising the step of:

displaying a color to indicate that an external device has confirmed the receipt of data.

40. The method of claim 38 wherein the activation switch includes an infrared transmitter and receiver, said activation switch being activated by placing an object between the infrared transmitter and receiver to break a circuit of infrared light and cause the switch to be in an ON position and the object is removed from between the receiver and transmitter to close a circuit of infrared light and cause the switch to be in an OFF position.

* * * * *